Figure 1:
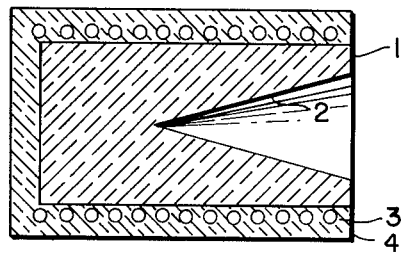

United States Patent Office 3,138,697
Patented June 23, 1964

3,138,697
BLACK BODY RADIATION SOURCES
Maggio Charles Banca, Old Greenwich, and Robert Bowling Barnes, Stamford, Conn., assignors to Barnes Engineering Company, Stamford, Conn., a corporation of Delaware
Filed Oct. 16, 1962, Ser. No. 230,915
9 Claims. (Cl. 219—353)

This invention relates to improved black body radiation sources.

In recent years there has been an extensive development in black body radiation sources, particularly for use in the infrared although there have been some sources at a sufficiently high temperature so that they radiate to a considerable degree in the visible as well as in the infrared. Essentially the black body source used have depended to a considerable extent on multiple reflections to eliminate any departure of a material used in the black body source from unity emissivity. The most common shape of such black body sources is a hollow conical cavity which is often in a block of stainless steel with a suitable low reflectance oxide layer on the walls of the conical cavity. The black body source is usually heated to a predetermined temperature by means of electrical heaters and is normally provided with suitable thermostatting means. For sources at moderate temperatures, for example up to 500 or 600° C., no severe problems are encountered but when it is attempted to make black body sources operable at higher temperatures, for example 2,000° C., severe problems arise. For practical purposes this has limited black body sources of the type described to temperatures not greatly exceeding 1,000° C.

It is the purpose of the present invention to improve the black body sources, particularly for the cases where high temperatures are required. Black body sources, of stainless steel for example, present considerable problems when high temperatures are involved. In the first place the material has a limited resistance to high temperatures and the problem of maintaining the cavity walls at a uniform high temperature is a formidable one. It has been proposed to place black body sources in furnaces but this raises other problems such as optical windows and the like and has not achieved any considerable success.

The present invention involves improved black body sources, the primary novel feature involving the use of materials which have hitherto not been used. These materials are strongly thermally anisotropic materials. The materials are formed of elements or compounds of the third, fourth and fifth groups of the periodic system. Elements of the fourth group may be used alone or compounds of elements of the third and fifth group may be employed. In each case the average valence of the elements going into the material is four. Typically materials are pyrolytic graphite, a corresponding crystalline form of boron nitride, silicon and the like. The materials have a crystal structure resembling that of graphite with the hexagonal layer crystals precisely oriented. They are usually prepared pyrolytically by deposition at high temperatures.

In the case of pyrolytic graphite the thermal conductivity is relatively high along the $a$-axis, that is to say crystallites having layer planes parallel to the deposition surface on which they are pyrolytically deposited. The conductivity is low at right angles that is to say along the $c$-axis. It should be noted that the graphite does not have to be a single crystal, as polycrystalline material in which the orientation is maintained with sufficient precision also exhibits useful degrees of anisotropicity.

It should be understood that the strongly thermally anisotropic materials which are used in the present invention do not have to be single crystals nor do they have to have their crystal orientation perfect. In other words the thermal anisotropy can vary over a considerable range depending on the degree of perfection of crystal orientation. In the present invention it is possible to use materials having a ratio of anisotropy of at least about 10 but it is preferred to use materials with higher ratios, for example materials in which the anisotropy ratio is not significantly less than 100 or even higher.

It is an advantage that many of the strongly thermally anisotropic materials which are used in the present invention also have a very high temperature tolerance before they become destroyed or degraded. With pyrolytic graphite and boron nitride temperatures of 2,000° C. or even higher can be reached and so they lend themselves particularly to the production of high temperature black body sources although the advantages of good conductivity of the heat into the black body source with poor conductivity sideways are present at lower temperatures and so the present invention can be used for low temperature black body sources although there the advantages over the sources used at present are not quite as marked as at the higher temperatures. The ratio of anisotropy is not completely independent of temperature. However, with any material falling under the present invention the ratio may actually rise at higher temperatures which is an advantage in the case of sources which are to be maintained at these high temperatures. Variation with temperature is not precipitate so that there is adequate ratio of anisotropy even at lower temperatures.

While the present invention includes the use of any strongly thermally anisotropic material having an average valence of four, boron nitride is preferred for many uses as it is an insulator, which pyrolytic graphite is not. It also has other desirable physical characteristics and constitutes the preferred modification of the present invention.

The strongly thermally anisotropic materials may be used to form the black body cavity themselves or they may be used as insulators surrounding a black body cavity made of other materials such as, for example stainless steel. When the anisotropic material is used for the source cavity itself it is sometimes desirable, particularly in the case of boron nitride, to modify the cavity surface, for example by coating with carbon to increase its emissivity. The boron nitride does not show quite as high emissivity as pyrolytic graphite and for some purposes therefore a coating of the cavity face may be desirable.

Figure 2:
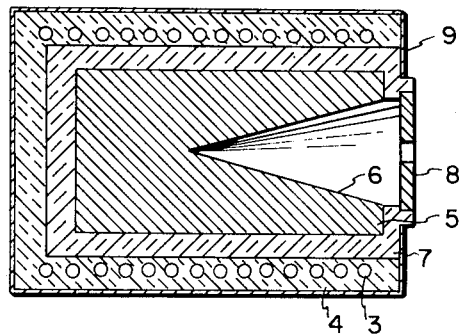

The invention will be described in greater detail in conjunction with the drawings in which:

FIG. 1 is an axial section through a black body radiation source of a single material, and FIG. 2 is an axial cross section through a black body source using a plurality of materials.

In FIG. 1 the material 1 is strongly thermally anisotropic boron nitride with the direction of strong thermal conductivity radial and that of low thermal conductivity axial. A conical cavity 2 constitutes the actual radiation source. It is shown as uncoated but may be coated if desired to increase the emissivity. The temperature of the block of boron nitride is maintained by means of the heater coil 3 which is turned on and off by a thermostatically controlled means. As these controls are not changed by the present invention they are not shown. A thermal insulator 4 surrounds the heating wiring and serves to keep the heat in the source. As boron nitride does not sublime until about 3,000° C. the black body source can be used for temperatures up to 2,000° or even 2,500°. The low conductivity in the horizontal direction prevents loss of heat from the end of the black body source or transfer of heat to other parts of the instrument.

FIG. 2 illustrates a composite black body source with a block of material 5 having a conical cavity 6. This material may be anything desired such as stainless steel. It is surrounded by a cup 7 of strongly thermally anisotropic boron nitride with the high conductivity radial and the low conductivity axial. This in turn is surrounded with a winding 3 and heat insulator 4 as in FIG. 1. Projections of the cup 7 support an aperture plate 8. Good transfer of heat from the heating winding to the black body cavity block is obtained and at the same time the heat transfer to the plate 8 is minimized. This plate may be of any suitable material and may in fact be of strongly thermally anisotropic boron nitride or pyrolytic graphite in which case also preferably the high thermal conductivity direction is radial and the low conductivity axial. The high conductivity serves to dissipate heat from the plate to the outer shell 9 of the black body source and therefore keeps the temperature of the plate from becoming high enough with high temperature black body sources so that it would also constitute an infrared source of significant power.

If the boron nitride is replaced by pyrolytic graphite similar results are obtained except, of course, that some insulation must be provided between the heater winding wires and the graphite as the latter is a conductor of electricity. The insulation problem is no different than in the standard stainless steel sources and so in the drawings no special insulating layer is shown.

When the material of the black body source has good heat conductivity, for example when it is a metal such as stainless steel, the cup 7 need not extend all the way back because its principal purpose is to insulate thermally the plate 8 and in such cases only the end portion of the cup between the edge of the conical cavity and the window need be made of the strongly thermally anisotropic materials of the present invention. The provision of a whole cylindrical cup as in FIG. 2 presents a mechanically more robust structure and is therefore advantageous for some purposes even though portions of the cup are not required for thermal insulation of the plate 8.

When pyrolytic graphite is used as a material for the black body source it is sometimes necessary, particularly in the case of higher temperature sources, to prevent contact with oxygen so that no chemical reaction takes place between the graphite and oxygen. This is not a particularly difficult problem, as the instrument may be provided with an inert atmosphere such as argon, helium and the like. However, the relative insensitivity to oxidation of boron nitride is a further advantage which is an additional reason why this material is preferred.

The insulating characteristics of boron nitride may also be used in another way. At high temperatures it is desirable to provide heater wires which are not covered with insulation and this can be effected readily by cutting threads in the outside of the boron nitride block, or boron nitride cup in the case of FIG. 2, in which grooves the heating wire is laid which prevents movement of the wire with consequent short circuiting of turns.

We claim:
1. A black body source of radiation comprising,
 (a) a black body having an axial source cavity opening at one end thereof,
 (b) heating means surrounding the cavity and being at least approximately coaxial therewith and extending axially sufficiently to substantially surround at least the major portion of the cavity adjacent its opening,
 (c) strongly thermally anisotropic material composed essentially of at least one element selected from those of the third, fourth and fifth groups of the periodic system, the elements of which the material is composed having an average valance of 4, the material being between the winding and the cavity and having a direction of high thermal conductivity substantially normal to the winding and the direction of low thermal conductivity substantially parallel to the axis of the cavity, the thermal anisotropy ratio being in excess of 10:1.

2. A black body radiation source according to claim 1 in which the thermally anisotropic material is strongly thermally anisotropic boron nitride.

3. A black body radiation source according to claim 1 in which the thermally anisotropic material is pyrolitic graphite.

4. A black body radiation source according to claim 1 in which the block containing the radiation cavity is itself made of the strongly thermally anisotropic material with the directions of high conduction substantially normal to the cavity axis and the direction of low thermal conductivity substantially parallel to the cavity axis.

5. A black body radiation source according to claim 4 in which the thermally anisotropic material is strongly thermally anisotropic boron nitride.

6. A black body radiation source according to claim 4 in which the thermally anisotropic material is pyrolitic graphite.

7. A black body radiation source according to claim 1 in which the cavity containing block is of thermally isotropic material and is at least partially surrounded by a layer of the strongly thermally anisotropic material which layer projects beyond the cavity end of the block.

8. A black body radiation source according to claim 7 in which the thermally anisotropic material is strongly thermally anisotropic boron nitride.

9. A black body radiation source according to claim 7 in which the thermally anisotropic material is pyrolytic graphite.

References Cited in the file of this patent
UNITED STATES PATENTS

| | | |
|---|---|---|
| 2,827,539 | Smith et al. | Mar. 18, 1958 |
| 2,952,762 | Williams et al. | Sept. 13, 1960 |